(12) United States Patent
Markgraf et al.

(10) Patent No.: US 10,731,027 B2
(45) Date of Patent: *Aug. 4, 2020

(54) COUPLED GLASS-FIBER REINFORCED POLYOXYMETHYLENE

(71) Applicant: Celanese Sales Germany GmbH, Sulzbach (Taunus) (DE)

(72) Inventors: Kirsten Markgraf, Weinheim (DE); Lowell Larson, Independence, KY (US)

(73) Assignee: Celanese Sales Germany GmbH, Sulzbach (Tanus) (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/087,036

(22) Filed: Mar. 31, 2016

(65) Prior Publication Data

US 2016/0257805 A1 Sep. 8, 2016

Related U.S. Application Data

(63) Continuation of application No. 13/879,346, filed as application No. PCT/EP2011/067992 on Oct. 14, 2011, now Pat. No. 9,303,145.

(30) Foreign Application Priority Data

Oct. 14, 2010 (EP) ..................... 10187614

(51) Int. Cl.
*C08K 7/14* (2006.01)
*C08G 18/56* (2006.01)
(Continued)

(52) U.S. Cl.
CPC ............... *C08K 7/14* (2013.01); *C08G 18/56* (2013.01); *C08G 18/7671* (2013.01); *C08K 5/29* (2013.01);
(Continued)

(58) Field of Classification Search
CPC ........ C08K 5/18; C08K 7/14; C08K 5/34922; C08K 5/29; C08L 59/02; C08L 61/02; C08G 18/56; C08G 18/7671
See application file for complete search history.

(56) References Cited

U.S. PATENT DOCUMENTS 3,455,867 A 7/1969 Berardinelli et al.
3,574,786 A 4/1971 Ishida et al.
(Continued)

FOREIGN PATENT DOCUMENTS

CN 101130621 2/2008
CN 101343396 1/2009
(Continued)

OTHER PUBLICATIONS

Mehrabzadeh et al. Impact Modification of Polyacetal by Thermoplastic Elastomer Polyurethane. Journal of Applied Polymer Science, Vo. 84, 2573-2582 (2002).*
(Continued)

*Primary Examiner* — John E Uselding
(74) *Attorney, Agent, or Firm* — Dority & Manning, P.A.

(57) ABSTRACT

The present invention relates to a molding composition, a process for manufacturing the molding composition, and molded parts obtainable from the molding composition. The molding composition can contain at least one polyoxymethylene having terminal OH-groups, at least one polyisocyanate coupling agent, at least one reinforcing fiber, and at least one formaldehyde scavenger. The moldings produced from the molding composition are distinguished by their improved mechanical properties while having low formaldehyde emissions and excellent tensile strength while having a good flex fatigue and creep performance.

28 Claims, 2 Drawing Sheets

(51) Int. Cl.
*C08G 18/76* (2006.01)
*C08K 5/3492* (2006.01)
*C08L 61/02* (2006.01)
*C08K 5/29* (2006.01)
*C08L 59/02* (2006.01)

(52) U.S. Cl.
CPC .......... *C08K 5/34922* (2013.01); *C08L 59/02* (2013.01); *C08L 61/02* (2013.01); *C08L 2201/08* (2013.01)

(56) References Cited

U.S. PATENT DOCUMENTS

| | | | |
|---|---|---|---|
| 3,883,468 A * | 5/1975 | Schmidt | C03C 25/40 524/263 |
| 3,901,846 A | 8/1975 | Freed | |
| 3,985,661 A | 10/1976 | Ikeda et al. | |
| 4,070,415 A | 1/1978 | Sextro et al. | |
| 4,469,842 A | 9/1984 | Kritchevsky | |
| 4,480,071 A | 10/1984 | Natarajan et al. | |
| 4,493,751 A | 1/1985 | Cherdron et al. | |
| 4,652,594 A | 3/1987 | Auerbach et al. | |
| 4,670,508 A | 6/1987 | Ohdaira et al. | |
| 4,780,508 A | 10/1988 | Cunningham et al. | |
| 4,828,755 A | 5/1989 | Kusumgar et al. | |
| 4,929,712 A | 5/1990 | Sugiyama et al. | |
| 5,156,913 A | 10/1992 | Collins et al. | |
| 5,326,846 A | 7/1994 | Nagai et al. | |
| 5,344,875 A | 9/1994 | Niino | |
| 5,393,813 A | 2/1995 | Schauhoff et al. | |
| 5,446,086 A | 8/1995 | Sugiyama et al. | |
| 5,478,895 A | 12/1995 | Sugiyama et al. | |
| 5,530,061 A | 6/1996 | Sanada et al. | |
| 5,866,256 A | 2/1999 | Izumitani et al. | |
| 5,942,568 A | 8/1999 | Niino et al. | |
| 6,077,908 A | 6/2000 | Yahiro | |
| 6,211,268 B1 | 4/2001 | Matsumura et al. | |
| 6,238,733 B1 | 5/2001 | Therolf | |
| 6,271,302 B1 | 8/2001 | Matsushima | |
| 6,936,651 B2 | 8/2005 | Flexman et al. | |
| 7,169,887 B2 | 1/2007 | Papke | |
| 7,943,726 B2 | 5/2011 | Haubs et al. | |
| 8,178,479 B2 | 5/2012 | Cernohous | |
| 8,318,866 B2 | 11/2012 | Kurz et al. | |
| 8,829,085 B2 | 9/2014 | Markgraf et al. | |
| 2002/0016395 A1 * | 2/2002 | Niino | C08G 2/38 524/394 |
| 2005/0043492 A1 | 2/2005 | Chin et al. | |
| 2005/0107513 A1 | 5/2005 | Papke | |
| 2005/0222303 A1 | 10/2005 | Cernohous | |
| 2006/0058457 A1 | 3/2006 | Kawaguchi | |
| 2006/0111473 A1 | 5/2006 | Yuan et al. | |
| 2007/0066746 A1 | 3/2007 | Gunnewig et al. | |
| 2009/0264583 A1 | 10/2009 | Kurz et al. | |
| 2010/0022691 A1 | 1/2010 | Katsuchi et al. | |
| 2010/0056676 A1 | 3/2010 | Hase | |
| 2011/0034610 A1 * | 2/2011 | Mulholland | C08K 3/08 524/441 |
| 2011/0184098 A1 | 7/2011 | Sunaga et al. | |
| 2013/0102718 A1 | 4/2013 | Markgraf et al. | |
| 2013/0331488 A1 | 12/2013 | Markgraf et al. | |
| 2014/0179865 A1 | 6/2014 | Markgraf et al. | |

FOREIGN PATENT DOCUMENTS

| | | |
|---|---|---|
| CN | 101759955 | 6/2010 |
| CN | 102532798 | 7/2012 |
| CN | 103131124 | 6/2013 |
| DE | 2162345 | 7/1972 |
| EP | 1630198 A1 | 1/2006 |
| GB | 1331829 | 9/1973 |
| JP | 55-145529 | 11/1980 |
| JP | 56-105905 | 8/1981 |
| JP | 3284675 | 12/1991 |
| JP | 6179671 | 6/1994 |
| JP | 7010871 | 1/1995 |
| JP | 7033766 | 2/1995 |
| JP | 7-90144 | 4/1995 |
| JP | 07242724 | 9/1995 |
| JP | 11 181232 | 7/1999 |
| JP | 11181231 | 7/1999 |
| JP | 2000154181 | 6/2000 |
| JP | 2000-336241 | 12/2000 |
| JP | 4741120 | 6/2002 |
| JP | 2009-286874 | 12/2009 |
| JP | 2010037445 | 2/2010 |
| JP | 2011246566 | 12/2011 |
| WO | WO 1999/4646331 | 9/1999 |
| WO | WO 2006/105918 A1 | 12/2006 |
| WO | WO 2010/035351 A1 | 1/2010 |
| WO | WO 2010/073529 | 7/2010 |
| WO | WO 2013/156227 | 10/2013 |

OTHER PUBLICATIONS

Wallenberger et al. Fiberglass and Glass Technology: Energy-Friendly Compositions and Applications. p. 165. Springer. Dec. 14, 2009. (Year: 2009).*

Babu et al. Studies on Mechanical, Thermal, and Morphological Properties of Glass Fibre Reinforced Polyoxymethylene Nanocomposite. Hindawi Publishing Corporation. Journal of Applied Chemistry. vol. 2014, Article ID 782618, pp. 1-8. (Year: 2014).*

Kawaguchi et al., "Tensile Behavior of Glass-Fiber Filled Polyacetal: Influence of the Functional Groups of Polymer Matrices", Journal of Applied Polymer, Science, Wiley, US, vol. 107, No. 1, Jan. 5. 2008, pp. 667-673.

Zhou JianSong et al, "Advance on tribological performance of ultra high molecular weight polyethylene" Journals of Materials and Engineering, vol. 23, No. 1, pp. 142-145.

Deng Wenjuan et al, "Study on tribological properties of PON/HDPE blend", Engineering Plastics Application, vol. 38, No. 6, pp. 54-56.

Search Report & Written Opinion for Application No. PCT/EP2011/067992 dated Aug. 12, 2011.

European Search 2010 Report for application No. EP10187614 dated Dec. 29, 2010.

Chinese Search 2011 Search Report for application 201180056852.7 dated Oct. 14, 2011.

JPH0822122 English abstract only.

GUR Ultra-high molecular weight polyethylene, Ticona, Mar. 2001.

Mehrabzadeh et al., Impact Modification of Polyacetal by Thermoplastic Elastomer Polyurethane, Journal of Applied Polymer Science, vol. 84, 2573-2582 (2002).

Finlayson et al., Peculiar Chemical Reactions of NCO-Modified Epoxy Acrylate Resin Systems With Fiber Surface Treatment Agents Within CF/GF Hybrid Laminates and Their Mechanical Properties, Composite Materials, 6 Japan/US Conference, ppp. 222-230, Jan. 15, 1993.

* cited by examiner

Ex. 30  Ex. 31  Ex. 34

COUPLED GLASS-FIBER REINFORCED POLYOXYMETHYLENE

RELATED APPLICATIONS

The present application is based on and claims priority to U.S. patent application Ser. No. 13/879,346 having a 371(c) date of Aug. 29, 2013, which claims priority to PCT International Application No. PCT/EP2011/067992 filed Oct. 14, 2011 and which claims filing benefit of European Patent Application No. 10187614.2 filed on Oct. 14, 2010, which are all hereby incorporated by reference in their entirety.

FIELD OF THE INVENTION

The present invention relates to a molding composition, a process for the manufacturing of said molding composition, molded parts obtainable therefrom as well as the use of the molding composition for the manufacturing of molded parts used in the automotive industry, for housings, latches, window winding systems, wiper systems, sun roof systems, seat adjustments, levers, gears, claws, pivot housing or wiper arms.

BACKGROUND OF THE INVENTION

The superior mechanical properties of polyoxymethylene (POM) molding compositions are the reason for their use in numerous applications. To improve their properties, the polyoxymethylene homo- and -copolymers are provided with additives to adapt the properties to the application, for example by using reinforcing fibers.

The effect of these additives on the properties of the molding composition is affected by the coupling of the additive to the plastics matrix. Attempts to couple glass fibers to a polyoxymethylene matrix are known in the prior art.

DE 2162345 discloses a thermoplastic composition comprising a polyoxymethylene, an isocyanate coupling agent and reinforcing glass fibers wherein the glass fibers are sized with aminoalkylsilane compounds. The diisocyanate coupling agent is used to improve the compatibility of the polyoxymethylene matrix with the reinforcing fibers.

Isocyanate coupling agents are highly reactive with nucleophilic groups such as OH or $NH_2$ groups. Therefore, the use of further additives to reinforce polyoxymethylene compositions which comprise coupling agents on basis of isocyanates are limited.

US 2005/0107513 tries to avoid these problems and uses a catalyst which catalyses the chemical reaction between the polyacetal matrix polymer and the surface of the additive, i.e. the glass fiber. Thus, the use of a coupling agent is avoided. However, coupling agents such as isocyanates are very effective and contribute to the mechanical properties of the fiber reinforced polyoxymethylene compositions. On the other hand, sensitive additives which can react with the coupling agents were believed to be avoided. Consequently, additives which reduce the formaldehyde emission have not been used in the prior art for fiber reinforced polyoxymethylene molding compositions due to the presence of highly reactive isocyanate coupling agents.

POM has also been used to produce long glass fiber POM composites. Standard POM has shown the same poor adhesion to long glass fiber as is seen with short glass fiber. A way to overcome the adhesion problems is to use an ethyltriphenylphosphoniumbromide catalyst to promote the adhesion of standard POM to the long glass fiber as described in patents EP-B1-1483333 and U.S. Pat. No. 7,169,887 B2. The catalyst technology improves the mechanical strength of the POM/long glass fiber composites, compared to standard POM/long glass fiber composites, but the product still does not have sufficient tensile strength for some applications such as seat rails for automobiles which require good tensile strength and good flex fatigue and creep performance.

The object of the present invention is the provision of a fiber reinforced polyoxymethylene composition which demonstrates improved mechanical properties while having low formaldehyde emissions.

A further object of the invention is the provision of fiber reinforced polyoxymethylene compositions which show an excellent tensile strength while having a good flex fatigue and creep performance.

BRIEF DESCRIPTION OF THE DRAWINGS

A full and enabling disclosure of the present disclosure is set forth more particularly in the remainder of the specification, including reference to the accompanying figures, in which.

DETAILED DESCRIPTION OF THE INVENTION

Figure 1:
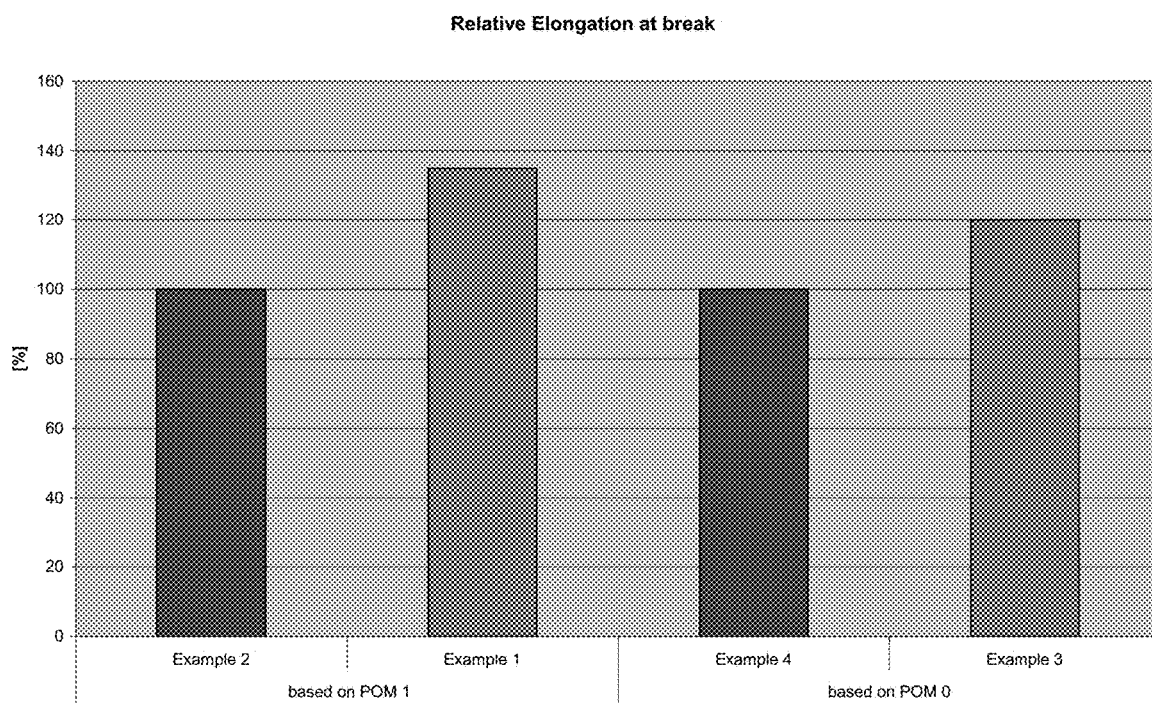
FIG. 1 shows the elongation at break for Examples 1-4.

It has surprisingly been found that fiber reinforced compositions which comprise at least one polyoxymethylene with a high amount of hydroxy groups, at least one coupling agent, at least one reinforcing fiber and optionally at least one formaldehyde scavenger lead to a molding composition which has excellent mechanical properties and low formaldehyde emissions which are required for many applications especially in the automotive industry and because of environmental aspects. Moreover, the compositions show an excellent tensile strength while having a good flex fatigue and creep performance, in particular at higher temperatures.

An embodiment of the present invention is a molding composition comprising
a) at least one polyoxymethylene (A), having terminal OH-groups of more than 15 mmol/kg,
b) at least one coupling agent (B),
c) at least one reinforcing fiber (C) and
d) optionally at least one formaldehyde scavenger (D).

Component (A)

The molding composition according to the present invention comprises at least one polyoxymethylene (A) having terminal OH-groups of more than 15 mmol/kg (hereinafter also referred to as "component (A)"). Component (A) of the molding composition according to the invention is a polyoxymethylene homo- or -copolymer. Preferably, the polyoxymethylene (A) has a high content of terminal hydroxyl groups and more preferably contains no low molecular weight constituents or only a small proportion thereof. Polyoxymethylene (A) preferably has terminal hydroxyl groups, for example hydroxyethylene groups ($-OCH_2CH_2-OH$) and hemi-acetal groups ($-OCH_2-OH$). According to a preferred embodiment, at least 25%, preferably at least 50%, more preferably at least 75% of the terminal groups of the polyoxymethylene (A) are hydroxyl groups, especially hydroxyethylene groups.

The content of hydroxyl groups end groups is especially preferred at least 80%, based on all terminal groups. Within the meaning of the present invention, the term "all terminal groups" is to be understood as meaning all terminal and—if present—all side terminal groups.

In addition to the terminal hydroxyl groups, the POM may also have other terminal groups usual for these polymers. Examples of these are alkoxy groups, formate groups, acetate groups or aldehyde groups. According to a preferred embodiment of the present invention the polyoxymethylene (A) is a homo- or copolymer which comprises at least 50 mol-%, preferably at least 75 mol-%, more preferably at least 90 mol-% and most preferably at least 95 mol-% of —CH$_2$O-repeat units.

It has been found that molding compositions which demonstrate an extremely high impact resistance can be obtained with a polyoxymethylene (A) which has low molecular weight constituents having molecular weights below 10,000 Dalton of less than 15% by weight, preferably less than 10% by weight, more preferably less than 7% by weight and most preferably less than 5% by weight, based on the total mass of the polyoxymethylene.

The "POM polymers" which can be used as polyoxymethylene (A) generally have a melt volume rate MVR of less than 50 cm$^3$/10 min, preferably ranging from 1 to 50 cm$^3$/10 min, further preferably ranging from 1 to 20 cm$^3$/10 min, more preferably ranging from 2 to 15 cm$^3$/10 min and especially ranging from 4 to 13 cm$^3$/10 min, determined according to ISO 1133 at 190° C. and 2.16 kg.

However, depending on the application of the molding composition and the nature and structure of the reinforcing fibers in the molding composition a higher melt volume rate MVR can be desired. According to an alternative embodiment of the present invention the polyoxymethylene (A) has a MVR of more than 35 cm$^3$/10 min, preferably ranging from 40 to 100 cm$^3$/10 min, especially ranging from 55 to 90 cm$^3$/10 min, determined according to ISO 1133 at 190° C. and 2.16 kg. Furthermore, impregnation of the long fibers is improved.

Preferably, polyoxymethylene (A) has a content of terminal hydroxyl groups of at least 16 mmol/kg, preferably at least 18 mmol/kg, more preferably ranging from 15 to 50 mmol/kg and most preferably ranging from 18 to 40 mmol/kg, especially ranging from 20 to 30 mmol/kg.

However, depending on the application of the molding composition and the nature and structure of the reinforcing fibers in the molding composition a higher content of terminal hydroxyl groups can be desired. According to an alternative embodiment of the present invention the polyoxymethylene (A) has a content of terminal hydroxyl groups of at least 40 mmol/kg, preferably at least 55 mmol/kg, more preferably ranging from 60 to 95 mmol/kg and most preferably ranging from 70 to 90 mmol/kg, especially ranging from 80 to 85 mmol/kg. It has been found that especially the mechanical performance of long fiber reinforced compositions can be improved by use of a polyoxymethylene with a higher content of terminal hydroxyl groups. Furthermore, impregnation of the long fibers is improved.

The content of terminal hydroxyl groups can be determined as described in K. Kawaguchi, E. Masuda, Y. Tajima, Journal of Applied Polymer Science, Vol. 107, 667-673 (2008).

The preparation of the polyoxymethylene (A) can be carried out by polymerization of polyoxymethylene-forming monomers, such as trioxane or a mixture of trioxane and dioxolane, in the presence of ethylene glycol as a molecular weight regulator. The polymerization can be effected as precipitation polymerization or in particular in the melt. Initiators which may be used are the compounds known per se, such as trifluoromethane sulfonic acid, these preferably being added as solution in ethylene glycol to the monomer. The procedure and termination of the polymerization and working-up of the product obtained can be effected according to processes known per se. By a suitable choice of the polymerization parameters, such as duration of polymerization or amount of molecular weight regulator, the molecular weight and hence the MVR value of the resulting polymer can be adjusted. The criteria for choice in this respect are known to the person skilled in the art. The above-described procedure for the polymerization leads as a rule to polymers having comparatively small proportions of low molecular weight constituents. If a further reduction in the content of low molecular weight constituents were to be desired or required, this can be effected by separating off the low molecular weight fractions of the polymer after the deactivation and the degradation of the unstable fractions after treatment with a basic protic solvent.

This may be a fractional precipitation from a solution of the stabilized polymer, polymer fractions of different molecular weight distribution being obtained.

Preference is also given to polyoxymethylene (A) which also is obtainable by polymerizing polyoxymethylene forming monomers in the presence of heteropoly acids.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. In one embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than 2% by weight.

The heteropoly acid is a generic term for polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

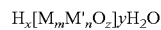

$$H_x[M_mM'_nO_z]yH_2O$$

wherein

M represents an element selected from the group consisting of P, Si, Ge, Sn, As, Sb, U, Mn, Re, Cu, Ni, Ti, Co, Fe, Cr, Th and Ce, M' represents an element selected from the group consisting of W, Mo, V and Nb, m is 1 to 10, n is 6 to 40, z is 10 to 100, x is an integer of 1 or above, and y is 0 to 50.

The central element (M) in the formula described above may be composed of one or more kinds of elements selected from P and Si and the coordinate element (M') is composed of at least one element selected from W, Mo and V, particularly W or Mo.

Specific examples of heteropoly acids are selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropoly acids selected from 12-molybdophosphoric acid ($H_3PMo_{12}O_{40}$) and 12-tungstophosphoric acid ($H_3PW_{12}O_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfils the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

(ROOC)—(CH$_2$)$_n$—(COOR')

wherein
n is an integer from 2 to 12, preferably 3 to 6 and
R and R' represent independently from each other an alkyl group having 1 to 4 carbon atoms, preferably selected from the group consisting of methyl, ethyl, n-propyl, iso-propyl, n-butyl, iso-butyl and tert.-butyl.

In one embodiment, the polybasic carboxylic acid comprises the dimethyl or diethyl ester of the above-mentioned formula, such as a dimethyl adipate (DMA). The alkyl ester of the polybasic carboxylic acid may also be represented by the following formula:

(ROOC)$_2$—CH—(CH$_2$)$_m$—CH—(COOR')$_2$ wherein
m is an integer from 0 to 10, preferably from 2 to 4 and
R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

Specific examples of the alkyl ester of a polybasic carboxylic acid are selected from the group consisting of dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

Preferably, the heteropoly acid is dissolved in the alkyl ester of the polybasic carboxylic acid in an amount lower than 5 weight percent, preferably in an amount ranging from 0.01 to 5 weight percent, wherein the weight is based on the entire solution.

As mentioned before, the term polyoxymethylenes comprises both, homopolymers of formaldehyde or its cyclic oligomers, such as trioxane or 1,3,5,7-tetraoxacyclooctane, and corresponding copolymers. For example the following components can be used in the polymerization process: ethyleneoxide, 1,2-propyleneoxide, 1,2-butyleneoxide, 1,3-butyleneoxide, 1,3-dioxane, 1,3-dioxolane, 1,3-dioxepane and 1,3,6-trioxocane as cyclic ethers as well as linear oligo- or polyformales, like polydioxolane or polydioxepane.

Further, functionalized polyoxymethylenes which are prepared by copolymerization of trioxane and the formal of trimethylolpropane (ester), of trioxane and the alpha, alpha and the alpha, beta-isomers of glyceryl formal (ester) or of trioxane and the formal of 1,2,6-hexantriol (ester) can be used as polyoxymethylene (A).

Such POM homo- or copolymers are known per se to the person skilled in the art and are described in the literature.

The molding composition of the present invention preferably comprises polyoxymethylene (A) in an amount of up to 95 weight-% (wt.-%), preferably ranging from 40 to 90 weight-%, more preferably ranging from 55 to 85 weight-%, wherein the weight is based on the total weight of the molding composition.

Component (B)

As a further component, the molding composition of the present invention comprises at least one coupling agent (B).

The coupling agent provides a linkage between the polyoxymethylene (A) and the reinforcing fiber and/or the sizing material which is coated on the reinforcing fiber (C). In principle any coupling agent which is capable to react with nucleophilic groups such as —OH or —NH$_2$ can be used.

The coupling agent improves the compatibility of the reinforcing fibers (C) with the polymer matrix. A suitable coupling agent (B) is a polyisocyanate, preferably organic diisocyanate, more preferably a polyisocyanate selected from the group consisting of aliphatic diisocyanates, cycloaliphatic diisocyanates, aromatic diisocyanates and mixtures thereof.

Preferred are polyfunctional coupling agents, such as trifunctional or bifunctional agents.

Preferably, the polyisocyanate is a diisocyanate or a triisocyanate which is more preferably selected from 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethyl hexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl di isocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); dimeryl diisocyanate, dodecane-1,12-diisocyanate, 1,10-decamethylene di isocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis (isocyanato-methyl)cyclohexane, 1,6-diisocyanato-2,2,4,4-tetra-methylhexane, 1,6-diisocyanato-2,4,4-tetra-trimethyl hexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

Especially preferred are aromatic polyisocyanates, such as 4,4'-diphenylmethane diisocyanate (MDI).

The molding composition of the present invention comprises the coupling agent (B) preferably in an amount ranging from 0.1 to 5 weight-%, more preferably ranging from 0.2 to 3 weight-% and most preferably ranging from 0.3 to 1.5 weight-%, wherein the weight is based on the total weight of the composition.

Component (C)

A further component of the composition of the present invention is at least one reinforcing fiber (C).

Reinforcing fibers of which use may advantageously be made are mineral fibers, such as glass fibers, polymer fibers, in particular organic high-modulus fibers, such as aramid fibers, or metal fibers, such as steel fibers, or carbon fibers or natural fibers, fibers from renewable resources.

These fibers may be in modified or unmodified form, e.g. provided with a sizing, or chemically treated, in order to improve adhesion to the plastic. Glass fibers are particularly preferred.

Glass fibers are provided with a sizing to protect the glassfiber, to smooth the fiber but also to improve the adhesion between the fiber and the matrix material. A sizing usually comprises silanes, film forming agents, lubricants, wetting agents, adhesive agents optionally antistatic agents and plasticizers, emulsifiers and optionally further additives.

Specific examples of silanes are aminosilanes, e.g. 3-trimethoxysilylpropylamine, N-(2-aminoethyl)-3-aminopropyltrimethoxy-si lane, N-(3-trimethoxysilanylpropyl) ethane-1,2-diamine, 3-(2-aminoethyl-amino)propyltrimethoxysilane, N-[3-(trimethoxysilyl)propyl]-1,2-ethanediamine.

Film forming agents are for example polyvinylacetates, polyesters and polyurethanes. Sizing based on polyurethanes may be used advantageously.

The reinforcing fibers may be compounded into the polyoxymethylene matrix, for example in an extruder or kneader. However, the reinforcing fibers may also advantageously take the form of continuous-filament fibers sheathed or impregnated with the polyoxymethylene molding composition in a process suitable for this purpose, and then processed or wound up in the form of a continuous strand, or cut to a desired pellet length so that the fiber lengths and pellet lengths are identical. An example of a process particularly suitable for this purpose is the pultrusion process.

According to the invention, the long-fiber-reinforced polyoxymethylene molding composition may be a glass-fiber bundle which has been sheathed with one or more layers of the polyoxymethylene matrix polymer in such a way that the fibers have not been impregnated and mixing of the fibers and the polyacetal matrix polymer does not take place until processing occurs, for example injection molding. However, the fibers have advantageously been impregnated with the polyacetal matrix polymer.

According to a preferred embodiment, the molding composition of the present invention comprises at least one reinforcing fiber which is a mineral fiber, preferably a glass fiber, more preferably a coated or impregnated glass fiber. Glassfibers which are suitable for the molding composition of the present invention are commercially available, e.g. Johns Manville, ThermoFlow®Chopped Strand 753, OCV Chopped Strand 408 A, Nippon Electric Glass Co. (NEG) Chopped Strand T-651.

The reinforcing fibers are preferably present in the molding composition of the present invention in an amount ranging from 5 to 50 wt.-%, preferably 7 to 45 wt.-% and especially preferably from 10 to 40 wt.-%, wherein the weight is based on the total weight of the composition.

It has been surprisingly found that long fiber reinforced molding compositions show even improved mechanical properties compared to short fiber reinforced compositions. Moreover, the molding compositions of the present invention with long fiber reinforced polyoxymethylene even demonstrate improved flex fatigue and creep resistance of the molded products.

The coupling agent reacts with the active end groups of the POM polymer and with the sizing on the glass fiber to chemically bond the POM to the fiber glass. The chemical bond prevents the glass fiber from separating from the POM, as is typical for standard POM, due to the poor adhesion between the standard POM and the glass fiber. The increased bonding between the POM matrix and the long glass fiber improves the mechanical strength of the POM/fiber glass composites significantly.

According to a preferred embodiment of the invention the reinforcing fibers may also advantageously be impregnated or sheathed in the form of continuous-filament fibers with the remaining parts of the molding composition (polymer matrix) as defined in the present invention, i.e. the at least one polyoxymethylene (A) having terminal OH-groups of more than 15 mmol/kg, the at least one coupling agent (B)

and the other optional components such as the at least one formaldehyde scavenger (E) and/or other additives, in a suitable process and are wound up or processed in the form of a continuous strand, or chopped to a desired pellet length, so that the fiber lengths and pellet lengths are equal. An example of a process particularly suited to this purpose is the pultrusion process.

In one preferred embodiment of the invention, the long-fiber-reinforced molding composition of the invention is prepared by the pultrusion process, where
i) fiber bundles are conducted through a die charged with a melt made from a polymer matrix comprising at least one polyoxymethylene (A), the at least one coupling agent (B), and other optional components such as the at least one formaldehyde scavenger (E),
ii) the immersed fiber bundles are preferably conducted through a shaping die,
iii) the fiber bundles are optionally cooled,
iv) the fiber bundles are optionally postformed, and
v) the fiber bundles are cut to the length of the structure preferably substantially perpendicular to their running direction, or are wound up in the form of a continuous structure.

The impregnation of the fiber bundles with the polymer matrix, for example via pultrusion in step i) of the above process, may also take place by other suitable processes. For example, the fibers may be impregnated by a process in which the fiber bundle is saturated by the polymer matrix, wherein the fiber bundle is laid onto carrier equipment, and wherein the carrier equipment, together with the fiber bundle lying thereon, is conducted through impregnating equipment. A process of this type is described in EP-A-756 536.

The fiber may also be impregnated by a process in which a plastifying extruder is used and a fiber strand is conducted by way of guide apertures and preheating equipment and is wetted with a liquid-film of the polymer matrix in an impregnating apparatus and then is introduced into the plastifying extruder in which the individual fibers are chopped and mixed, the mixture being discharged in the form of a fiber-reinforced polymer composition of the invention, which may be capable of further processing, wherein the following steps can be used:
a) passing by way of coating nozzles into the inlet of the plastifying extruder, and preferably parallel to the extruder axes and approximately tangentially, the fiber strand is wound up onto an extruder screw and around the extruder screws in an advancing direction, and also drawn into holes in the extruder barrel, whose diameter has been enlarged by at least four times the thickness of the fiber strand, where
b) preferably in the inlet the right-hand coating nozzle directly applies a film of polymer to one side of the fiber strand, while application to the second side takes place indirectly by pressing the fiber strand into the liquid film of polymer matrix previously applied from the left-hand coating nozzle to the screw shaft, whereupon the individual continuous-filament fibers are subjected to impregnating or penetrating action at the extruder screws on both flat sides of the fiber strand in an inlet and impregnating section and these sides are wetted or saturated by the liquid films of thermoplastic polymer,
c) and preferably then the fiber strand or the individual fibers thoroughly saturated or thoroughly impregnated with polymer matrix are passed out of the inlet and impregnation section by way of a cutting edge into the short discharge and conveying section of a reduced-diameter barrel, and thus chopped into substantially predetermined lengths.

An example of the process of this type is described in DE-A-1 98 36 787.

The environmentally compatible and cost-effective process described preferably gives a small rod-shaped structure of a certain shape. The length of the rod-shaped structure is from 3 to 100 mm, preferably from 4 to 50 mm, and particularly preferably from 5 to 15 mm. The diameter of the rod-shaped structure, also termed a pellet, is generally from 1 to 10 mm, from 2 to 8 mm, and particularly preferably from 3 to 6 mm.

A further embodiment of the present invention is a process for the manufacturing of a long fiber reinforced molding composition comprising
   a) impregnating a continuous fiber filament with a polymer matrix comprising
      i) at least one polyoxymethylene (A) having terminal OH-groups of more than 15 mmol/kg,
      ii) at least one coupling agent (B), and
      iii) optionally at least one formaldehyde scavenger (D) and/or other additives; and
   b) optionally cutting the impregnated fiber filament into pellets.

Preferably, the polymer matrix is melt mixed prior to the impregnation of the continuous fiber filament. The continuous fiber filaments have already been described above. Preferably, the continuous fiber filament is part of a roving or yarn. The process of the invention uses preferably a roving or yarn.

The polyoxymethylenes (A) which can be used have already been defined above. According to a preferred embodiment of the process of the invention the polyoxymethylene (A) has a MVR of more than 35 $cm^3/10$ min, preferably ranging from 40 to 100 $cm^3/10$ min, especially ranging from 55 to 90 $cm^3/10$ min, determined according to ISO 1133 at 190° C. and 2.16 kg.

Further preferably, the polyoxymethylene (A) has a content of terminal hydroxyl groups of at least 40 mmol/kg, preferably at least 55 mmol/kg, more preferably ranging from 60 to 95 mmol/kg and most preferably ranging from 70 to 90 mmol/kg, especially ranging from 80 to 85 mmol/kg.

The molding compositions of the process preferably comprise
   40 to 90 wt.-% of polyoxymethylene (A),
   0.1 to 5.0 wt.-% of coupling agent (B), which is preferably a polyisocyanate; and
   5 to 45 wt.-% of the continuous fiber filament, preferably a glass fiber roving.

The especially preferred process is a pultrusion process.

According to one embodiment of the present process the polyoxymethylene (A) is melt blended with a coupling agent, such as a diisocyanate, and stabilizers in an extruder. The long glass fiber (continuous fiber filaments) is pulled through a die head where the fiber is impregnated with the molten resin. The glass concentration in the final product is controlled by adjusting the amount of resin that is left on the glass fiber when it exits the die head. The coupling agent reacts with the active end groups of the POM and the sizing on the glass fiber to chemically bond the POM to the fiber glass.

Component (D)

A further component of the molding composition of the present invention which may optionally be present is a formaldehyde scavenger (D). Formaldehyde scavengers are additives for scavenging formaldehyde. Suitable formaldehyde scavengers are nitrogen-containing stabilizers. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Advantageous compounds of this nature are aminopyridine and compounds derived therefrom. Any of the aminopyridines is in principle suitable, for example 2,6-diaminopyridine, substituted and dimeric aminopyridines, and mixtures prepared from these compounds. Other advantageous materials are polyamides and dicyane diamide, urea and its derivatives and also pyrrolidone and compounds derived therefrom. Examples of suitable pyrrolidones are imidazolidinone and compounds derived therefrom, such as hydantoines, derivatives of which are particularly advantageous, and those particularly advantageous among these compounds are allantoin and its derivatives. Other particularly advantageous compounds are tri-amino-1,3,5-triazine (melamine) and its derivatives, such as melamine-formaldehyde condensates and methylol melamine. Very particular preference is given to melamine, methylol melamine, melamine-formaldehyde condensates, and allantoin. Oligomeric polyamides are also suitable in principle for use as formaldehyde scavengers. The formaldehyde scavenger may be used individually or in combination.

Further, the aldehyde scavenger (D) can be a guanidine compound which can include an aliphatic guanamine-based compound, an alicyclic guanamine-based compound, an aromatic guanamine-based compound, a hetero atom-containing guanamine-based compound, or the like.

Examples of the aliphatic guanamine-based compounds include monoguanamines such as acetoguanamine, valeroguanamine, caproguanamine, heptanoguanamine, capryloguanamine or stearoguanamine; alkylene bisguanamines such as succinoguanamine, glutaroguanamine, adipoguanamine, pimeloguanamine, suberoguanamine, azeloguanamine or sebacoguanamine.

Examples of the alicyclic guanamine-based compounds include monoguanamines such as cyclohexanecarboguanamine, norbornene carboguanamine, cyclohexenecarboguanamine or norbornane carboguanamine; and derivatives thereof in which the cycloalkane residue is substituted with 1 to 3 functional groups such as alkyl group, hydroxy group, amino group, acetoamino group, nitrile group, carboxy group, alkoxycarbonyl group, carbamoyl group, alkoxy group, phenyl group, cumyl group or hydroxyphenyl group.

Examples of the aromatic guanamine-based compounds are monoguanamines such as benzoguanamine and derivatives thereof in which the phenyl residue is substituted with 1 to 5 functional groups such as alkyl group, hydroxy group, amino group, acetoamino group, nitrile group, carboxy group, alkoxy carbonyl group, carbamoyl group, alkoxy group, phenyl group, cumyl group or hydroxyphenyl group, (for example, toluguanamine, xyloguanamine, phenylbenzoguanamine, hydroxybenzoguanamine, 4-(4'-hydroxyphenyl)benzoguanamine, nitrilebenzoguanamine, 3,5-dimethyl-4-hydroxybenzoguanamine, 3,5-di-t-butyl-4-hydroxybenzoguanamine, and the like), naphthoguanamine and derivatives thereof in which the naphthyl residue is substituted with the above functional group; polyguanamines such as phthaloguanamine, isophthaloguanamine, terephthaloguanamine, naphthalene diguanamine or biphenylene diguanamine; aralkyl- or aralkylene-guanamines such as phenylacetoguanamine, [beta]-phenylpropioguanamine or xylylene bisguanamine.

Examples of the heteroatom-containing guanamine-based compound include acetal group-containing guanamines such as 2,4-diamino-6-(3,3-dimethoxypropyl-s-triazine; dioxane ring-containing guanamines such as [2-(4',6'-diamino-s-triazin-2'-yl)ethyl]-1,3-dioxane or [2-(4',6'-diamino-s-triazin-2'-yl)ethyl]-4-ethyl-4-hydroxymethyl-1,3-dioxane; tetraoxospiro ring-containing guanamines such as CTU-guanamine or CMTU-guanamine; isocyanuric ring-containing guanamines such as 1,3,5-tris(2-(4',6'-diamino-s-triazin-2'-yl)ethyl)isocyanurate or 1,3,5-tris[3-(4',6'-diamino-s-triazin-2'-yl)propyl]-isocyanurate); imidazoyl ring-containing guanamines such as guanamine compounds described in JP-A 6-179671 and JP-A 7-10871; imidazole ring-containing guanamines such as guanamine compounds described in JP-A 47-41120, JP-A 3-284675 and JP-A 7-33766; and guanamine compounds described in JP-A 2000-154181, and the like.

Furthermore, the guanamine-based compound includes a compound in which the hydrogen atom of the amino group of the aforementioned guanamine-based compound is substituted with an alkoxymethyl group such as mono- to tetra-methoxymethylbenzoguanamine, mono- to octa-methoxymethyl-CTU-guanamine, or the like.

Among these guanamine-based compounds, particularly preferable are guanamine, acetoguanamine, benzoguanamine, and CTU-guanamine.

Further formaldehyde scavengers (D) which are linked to oligomers or polymers are also suitable. Examples of these groups of formaldehyde scavengers are shown in formula I.

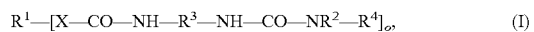

wherein $R^1$ is a moiety comprising 2 to 20 carbon atoms, preferably an aliphatic or aromatic rest, more preferably the aliphatic or aromatic rest of a polyhydroxy or a polyamino compound having at least 2, preferably 2 to 6 hydroxy and/or amino groups, X is —O— or —NR$^2$—

$R^2$ is H, alkyl, cycloalkyl, aryl or aralkyl, $R^3$ is alkylene, cycloalkylene, arylene or aralkylene, $R^4$ is a moiety selected from the formula II, III, IV, V, VI and VII

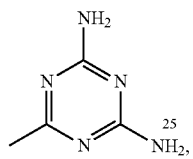

(II)

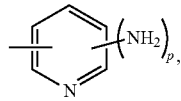

(III)

(IV)

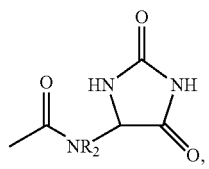

(V)

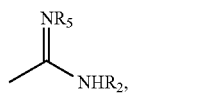

(VI)

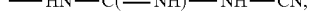

(VII)

wherein $R^5$ is H, —CO—CH$_3$ or —CO—C$_6$H$_5$, o is an integer ranging from 2 to 6 and p is 1 or 2.

Additionally, suitable formaldehyde scavengers (D) are imidazolidine-2-one compounds. Preference is given to imidazolidine-2-one compounds of the following formula:

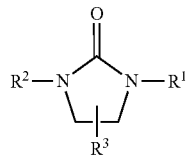

wherein $R^1$ and $R^2$ are independently from each other H, $C_1$-$C_{20}$-alkyl, OR4, —$NO_2$, hydroxyalkyl having 1 to 10 carbon atoms, $R^3$ is H, $C_1$-$C_{20}$ alkyl which is optionally substituted, keto group, aldehyde group, —COOR4, amine or amide group, or an aromatic ring having 5 to 10 carbon atoms, $R^4$ is a $C_1$-$C_4$-alkyl.

Especially preferred imidazolidine-2-one compounds are:

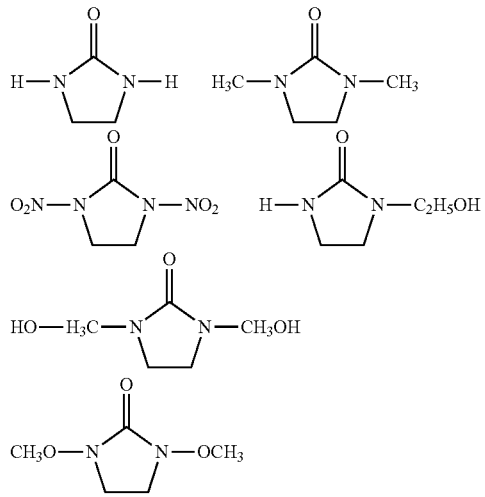

It has been surprisingly found that aromatic formaldehyde scavengers (D) are very suitable for the molding compositions of the present invention.

According to a preferred embodiment of the present invention, the formaldehyde scavenger (D) has a melting point higher than 235° C., preferably higher than 250° C., more preferably higher than 280° C., most preferably higher than 300° C. and especially higher than 320° C. Further, it has been found that the pKa value of the formaldehyde scavenger (D) may influence the formaldehyde emission. According to a preferred embodiment, the formaldehyde scavenger (D) has a pKa value ranging from 4.5 to 10, preferably from 4.5 to 6.5.

Further, preference is given to a formaldehyde scavenger (D) which has at least one triazine moiety. The use of formaldehyde scavengers which comprise at least one triazine moiety does not only have excellent formaldehyde reducing properties but also positively influences the mechanical properties of the molding composition. Preferred formaldehyde scavengers (D) which comprise a triazine moiety are selected from the group consisting of guanamine, melamine, N-butylmelamine, N-phenylmelamine, N,N-diphenylmelamine, N,N-diallylmelamine, N,N',N"-triphenylmelamine, benzoguanamine, acetoguanamine, 2,4-diamino-6-butyl-sym-triazine, ammeline, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, 1,1-bis(3,5-diamino-2,4,6-triazinyl)methane, 1,2-bis(3,5-diamino-2,4,6-triazinyl)ethyne (other name: succinoguanamine), 1,3-bis(3,5-diamino-2,4,6-triazinyl)propane, 1,4-bis(3,5-diamino-2,4,6-triazinyl)butane, methylenated melamine, ethylenedimelamine, triguanamine, melamine cyanurate, ethylene dimelamine cyanurate and riguanamine cyanurate.

These triazine derivatives may be used singly or in combinations of two or more compounds. Guanamines and melamine are preferred, and melamine is particularly preferable.

Preferred formaldehyde scavengers (D) are hydrazides, more preferably dihydrazides such as sebacic dihydrazide (SDH).

Examples of the hydrazide compound which can be used in the present invention as formaldehyde scavenger (D) include an aliphatic carboxylic acid hydrazide-based compound, an alicyclic carboxylic acid hydrazide-based compound, an aromatic carboxylic acid hydrazide-based compound, hetero atom-containing carboxylic acid hydrazide-based compound, a polymer-type carboxylic acid hydrazide-based compound, and the like. These carboxylic acid hydrazides can be used alone or in combination of two or more of them.

Examples of the aliphatic carboxylic acid hydrazide-based compound include: monocarboxylic acid hydrazide (lauric acid hydrazide, stearic acid hydrazide, 12-hydroxystearic acid hydrazide 1,2,3, 4-butane tetracarboxylic acid hydrazide or the like); polycaboxylatic acid hydrazide such as succinic acid mono- or di-hydrazide, glutaric acid mono- or di-hydrazide, adipic acid mono- or di-hydrazide, pimelic acid mono- or di-hydrazide, suberic acid mono- or di-hydrazide, azelaic acid mono- or di-hydrazide, sebacic acid mono- or di-hydrazide, dodecanedioic acid mono- or di-hydrazide, hexadecane dioic acid mono- or di-hydrazide, eicosandioic acid mono- or di-hydrazide, 7,11-octadecadiene-1,18-dicarbohydrazide, and the like. Examples of the alicyclic carboxylic acid hydrazide-based compound include: monocarboxylic acid hydrazides such as cyclohexane carboxylic acid hydrazide; and polycarboxylic acid hydrazides such as dimer acid mono- or di-hydrazide, trimer acid mono- to tri-hydrazide, 1,2-, 1,3-, or 1,4-cyclohexane dicarboxylic acid mono- or di-hydrazide, cyclohexane tricaboxylic acid mono- to tri-hydrazide, and the like. Examples of the aromatic carboxylic acid hydrazide include: mono-carboxylic acid hydrazides (benzoic acid hydrazide and functional group substitution products thereof, such as derivatives where functional groups such as alkyl group, hydroxy group, acetoxy group, amino group, acetoamino group, nitrile group, carboxy group, alkoxycarbonyl group, carbamoyl group, alkoxy group, phenyl group, benzyl group, cumyl group, or hydroxyphenyl group are substituted by 1 to 5 phenyl residues of benzoguanamine (for example, o-toluic acid hydrazide, m-toluic acid hydrazide, p-toluic acid hydrazide, 2,4-, 3,4-, 3,5- or 2,5-dimethyl-benzoic acid hydrazide, o-, m- or p-hydroxy-benzoic acid hydrazide, o-, m- or p-acetoxy-benzoic acid hydrazide, 4-hydroxy-3-phenyl-benzoic acid hydrazide, 4-actoxy-3-phenyl-benzoic acid hydrazide, 4-pheny-benzoic acid hydrazide, 4-(4'-phenyl) benzoic acid hydrazide, 4-hydroxy-3,5-dimethyl-benzoic acid hydrazide, 4-hydroxy-3,5-di-t-butyl-benzoic acid hydrazide, 4-hydroxy-3,5-di-t-butylphenyl-benzoic acid hydrazide, and 4-hydroxy-3,5-di-t-butylphenyl-propionic acid hydrazide); [alpha]- or [beta]-naphthoic acid hydrazide and functional substitution products thereof, such as 1-naphthoic acid hydrazide, 2-naphthoic acid hydrazide, 3-hydroxy-2-naphthoic acid hydrazide, or 6-hydroxy-2-naphthoic acid hydrazide; and polycarboxylic acid hydrazides such as isophthalic acid mono- or di-hydrazide, terephthalic acid mono- or di-hydrazide, 1,4- or 2,6-naphthalene dicarboxylic acid mono- or di-hydrazide, 3,3'-, 3,4'- or 4,4'-diphenyldicarboxylic acid mono- or di-hydrazide, diphenylether dicarboxylic acid mono- or di-hydrazide, diphenylmethane dicarboxylic acid mono- or di-hydrazide, diphenylethane dicarboxylic acid mono- or di-hydrazide, diphenoxyethane dicarboxylic acid mono- or di-hydrazide, diphenylsulphone dicarboxylic acid mono- or di-hydrazide, diphenylketone dicarboxylic acid mono- or di-hydrazide, 4,4''-terphenyl dicarboxylic acid mono- or di-hydrazide, 4,4'''-quaterphenyldicarboxylic acid mono- or di-hydrazide, 1,2,4-benzene tricarboxylic acid mono- to tri-hydrazide, pyromellitic acid mono- to tetra-hydrazide, and 1,4,5,8-naphthoic acid mono- to tetra-hydrazide).

Examples of the heteroatom-containing carboxylic acid hydrazide-based compound include: mono- or di-hydrazide of dioxane ring-containing carboxylic acid hydrazides such as 5-methylol-5-ethyl-2-(1,1-dimethyl-2-carboxyethyl)-1,3-dioxane; tetraoxo spiro ring-containing carboxylic acid hydrazides such as mono- or di-hydrazide of 3,9-bis(2-carboxyethyl)-2,4,8,10-tetraoxospiro[5,5]undecane, mono- or di-hydrazide of 3,9-bis(2-methoxycarbonylethyl)-2,4,8,10-tetraoxospiro[5,5] undecane, mono- or di-hydrazide of 3,9-bis(1,1-dimethyl-1-carboxymethyl)-2,4,8,10-tetraoxospiro[5,5]undecane, or mono- or di-hydrazide of 3,9-bis(1,1-dimethyl-1-methoxycarbonylmethyl)-2,4,8,10-tetraoxospiro[5,5]undecane; isocyanuric ring-containing carboxylic acid hydrazides such as mono- to tri-hydrazide of 1,3,5-tris[2-carboxyethyl]isocyanulate, or mono- to tri-hydrazide of 1,3,5-tris(3-caboxypropyl)isocyanurate; and hydantoin ring-containing carboxylic acid hydrazides such as 1,3-bis(2-hydrazinocarbonylethyl)5-isopropyl hydantoin.

The polymer-type carboxylic acid hydrazide-based compounds are exemplified as follows: single polymers or copolymers of poly(meth)acrylic acid hydrazides which may be cross-linked compounds, such as olefin copolymer, vinyl monomer copolymer, styrene copolymer of divinylbenzene crosslinked compound, or bis(meth)acrylic ester crosslinked compound; polymer described in JP-A 55-145529 and JP-A 56-105905; commercially available "amino polyacrylic amide APA" Otsuka Chemical Co., Ltd.; and copolymer described in U.S. Pat. No. 3,574,786.

Further, dicyandiamide (DCD) can be used as component (D).

Further, zeolites can be used as component (D).

According to a preferred embodiment of the present invention, the formaldehyde scavenger (D) has at least one —$NH_2$, preferably at least two —$NH_2$ groups, most preferably at least three —$NH_2$ groups.

It has surprisingly been found that an excellent performance can be achieved with a formaldehyde scavenger (D) which has a melting point which is at least 10° C., preferably at least 20° C., more preferably at least 30° C., even more preferably at least 50° C. higher than the melting point of the polyoxymethylene (A).

Especially preferred as a formaldehyde scavenger (D) is melamine.

The formaldehyde scavenger (D) is preferably present in the composition in an amount of up to 2 weight-%, more preferably in an amount ranging from 0.001 to 1.5 wt.-%, further more preferably ranging from 0.01 to 1.0 wt.-%, most preferably ranging from 0.05 to 0.5 wt.-% and especially ranging from 0.08 to 0.3 weight-%, wherein the weight is based on the total weight of the composition.

The molding materials or moldings according to the invention can optionally be stabilized and/or modified by known additives. Such stabilizers and processing auxiliaries used as optional component (E) are known to the person skilled in the art.

Component (E) is usually present in an amount up to 10 wt.-%, preferably 0.1 to 5 wt.-%, more preferably 0.5 to 3 wt.-%.

The stabilizers are, for example, antioxidants, acid scavengers, UV stabilizers or heat stabilizers. In addition, the molding material or the molding may contain processing auxiliaries, for example adhesion promoters, lubricants, nucleating agents, demolding agents, fillers, or antistatic agents and additives which impart a desired property to the molding material or to the molding, such as dyes and/or pigments and/or impact modifiers and/or glass beads and/or additives imparting electrical conductivity; and mixtures of these additives, but without limiting the scope to said examples.

The molding composition of the present invention may further comprise one or more tribological modifier. Various different types of tribological modifiers may be incorporated into the molding composition of the invention. The tribological modifier may comprise, for instance, polytetrafluoroethylene particles, molybdenum sulfide particles, calcium carbonate particles, polymer particles containing a graft copolymer of an olefin grafted to a polyvinyl or a polyether, graft copolymer particles containing an elastomeric core comprising a polydiene and a hard graft comprised of a (meth)acrylate and/or a (meth)acrylonitrile, ultrahigh-molecular-weight polyethylene particles, stearyl stearate particles, wax particles comprising an aliphatic ester wax comprised of a fatty acid and a monohydric alcohol, a polyethylene wax, silicon oil, or an amide wax, or mixtures thereof. In general, one or more tribological modifiers may be present in the composition in an amount from about 1% to about 50% by weight, preferably in an amount ranging from about 3 to about 30 wt.-%.

Possible tribological modifiers that may be added to the composition include the following:
(1) from 0.1-50.0% by weight, preferably from 1.0-25% by weight, of a polytetrafluoroethylene powder,
(2) from 0.1-10.0% by weight, preferably from 0.2-5% by weight, particularly preferably from 0.5-2% by weight, of a molybdenum disulfide ($MoS_2$) powder,
(3) from 0.1-50.0% by weight, preferably from 1.0-25% by weight, of a calcium carbonate (chalk) powder,
(4) from 0.1-50% by weight, preferably from 1.0-25.0% by weight, particularly preferably from 2.0-10% by weight of a graft copolymer which has an olefin polymer as graft base and, grafted to at least one vinyl polymer or one ether polymer, and/or a graft copolymer which has an elastomeric core based on polydienes and a hard graft composed of (meth)acrylates and/or of (meth)acrylonitriles.

Graft copolymers of the above type are described in EP-A-354,802 and EP-A-420,564 or in EP-A-156,285 and EP-A-668,317.

A suitable graft base for the graft copolymers of the first type is in principle provided by any of the olefin polymers or olefin copolymers, e.g. homopolymers, such as polyethylene or polypropylene, or copolymers derived from copolymerizable ethylenically unsaturated monomers, e.g. ethylenepropylene copolymers, ethylene-1-butene copolymers, or copolymers derived from ethylene and glycidyl (meth) acrylate.

Suitable graft monomers are in principle any of the ethylenically unsaturated monomers having polar groups, or other graftable monomers having polar groups, where these modify the polarity of the essentially non-polar graft base, e.g. ethylenically unsaturated carboxylic acids, such as (meth)acrylic acid and derivatives thereof, such as esters, nitriles, or amides, if appropriate in combination with comonomers, such as acrylonitrile, or styrene combined with acrylonitrile.

Particular preference is given to a graft copolymer based on polyethylene or polypropylene grafted with acrylonitrile or with styrene/acrylonitrile. Products of this type are known and are commercially available.

Preferred graft bases for the graft copolymers of the second type are polybutadiene, polyisoprene, and/or polybutadiene/styrene. Suitable graft monomers are in principle any of the ethylenically unsaturated monomers. These are preferably ethylenically unsaturated monomers having polar groups.

Particular preference is given to graft copolymers based on polybutadiene and on a two-shell graft envelope composed of polystyrene and polymethacrylate. Products of this type are known and are commercially available.

(5) from 0.1-50.0%, preferably from 1.0% to 25.0%, of an ultrahigh-molecular-weight polyethylene powder whose molar mass is >$10^6$ g/mol. Products of this type are known and are commercially available. An example of these is the product GUR 4120 and GUR 4150 from Ticona GmbH, Kelsterbach, Germany, (6) from 0.1%-10% by weight, preferably from 0.1-5.0% by weight, particularly preferably from 0.5-3% by weight, of stearyl stearate, (7) from 0.1%-10% by weight, preferably from 0.5-5.0% by weight, particularly preferably from 0.8-2.0% by weight, of a silicone oil, in order to suppress migration of silicone oil out of the moldings, it is advantageous to use a silicone oil whose molar mass is >20,000 g/mol.

In principle, it is possible to use any of the polysiloxanes that are liquid at room temperature (23° C.), as long as their molar mass is at least 20,000 g/mol, preferably from 25,000 to 300,000 g/mol. Typical viscosities of these silicone oils at 25° C. are in the region of from 500 to 300,000 mm$^2$/s. They are particularly preferably dialkylpolysiloxanes, in particular dimethylpolysiloxanes.

(8) from 0.1%-5.0% by weight, preferably from 0.5% to 3.0% by weight, of an oxidized polyethylene wax, (9) from 0.1%-5.0% by weight, preferably from 0.2-2.0% by weight, of an amide wax,

(10) from 0.1%-5.0% by weight, preferably from 0.5-3.0% by weight, of an aliphatic ester wax composed of a fatty acid and of a monohydric alcohol,

(11) from 0.1% to 5.0% by weight, preferably from 0.5-3.0% by weight, of a polyethylene wax.

In a specific embodiment of the present invention the tribological modifier comprises or substantially consists of an ultrahigh-molecular weight polyethylene (UHMW-PE). It has been found that specifically good results could be achieved with molding compositions which comprise coupling agents and reinforcing fibers.

Ultrahigh-molecular-weight polyethylene (UHMW-PE) can be employed for example as a powder, in particular as a micro powder. The use of UHMW-PE significantly reduces wear and improves the sliding properties. The UHMW-PE generally has a mean particle diameter $D_{50}$ (volume based and determined by light scattering) in the range of 1 to 5000 μm, preferably from 10 to 500 μm and particularly preferably from 10 to 150 μm such as 30 to 130 μm or 80 to 150 μm or 30 to 90 μm.

The UHMW-PE can have an average molecular weight of higher than $1.0 \cdot 10^6$ g/mol, preferably higher than $2.0 \cdot 10^6$ g/mol, more preferably higher than $4.0 \cdot 10^6$ g/mol, especially having an average molecular weight ranging from $1.0 \cdot 10^6$ g/mol to $15.0 \cdot 10^6$ g/mol, more especially ranging from $3.0 \cdot 10^6$ g/mol to $12.0 \cdot 10^6$ g/mol, determined by viscosimetry.

Preferably, the viscosity number of the UHMW-PE is higher than 1000 ml/g, more preferably higher than 1500 ml/g, especially ranging from 1800 ml/g to 5000 ml/g, such as ranging from 2000 ml/g to 4300 ml/g (determined according to ISO 1628, part 3; concentration in decahydronaphthalin: 0.0002 g/ml).

In a preferred embodiment the tribological modifier is an UHMW-PE.

Suitable UHMW-PE is commercially available from Ticona GmbH, Germany under the tradename GUR®, such as GUR®4120 and GUR®4150.

In a preferred embodiment the ultrahigh molecular weight polyethylene can be present in an amount up to 30 wt.-%, preferably in an amount ranging from 1 to 25 wt.-%, more preferably ranging from 2.5 to 20 wt.-%, especially 4.5 to 15 wt.-%, such as 5.5 to 12 wt.-%, e.g. 6.5 to 9.5 wt.-%, wherein the amount is based on the total weight of the composition.

A specially preferred molding composition of the invention comprises
a) 40 to 90 wt.-%, preferably 55 to 85 wt.-% of one or more polyoxymethylene(s)(A),
b) 0.2 to 3.0 wt.-%, preferably 0.3 to 1.5 wt.-% of one or more coupling agent(s) (B), preferably an aromatic polyisocyanate,
c) 5 to 45 wt.-%, preferably 10 to 40 wt.-% of one or more reinforcing fiber(s) (C), preferably glassfiber(s) and
d) optionally 0.05 to 0.5 wt.-%, preferably 0.08 to 0.3 wt.-% of one or more formaldehyde scavenger (D), preferably an aromatic formaldehyde scavenger, more preferably a formaldehyde scavenger having a melting point higher than 235° C., most preferably a formaldehyde scavenger having a melting point which is at least 10° C. higher than the melting point of the polyoxymethylene (A), and especially preferable melamine or a melamine derivative; wherein the weight is based on the total weight of the composition.

The reaction of the components is typically effected at temperatures of from 100 to 260° C., such as from 150 to 220° C., and the duration of mixing is typically from 0.2 to 60 minutes.

A further embodiment of the present invention is a process for the manufacturing of a molding composition of the present invention comprising the following steps:
a) melt mixing a composition comprising
at least one polyoxymethylene (A) having terminal OH-groups of more than 15 mmol/kg,
at least one coupling agent (B),
at least one reinforcing fiber (C) and
optionally at least one formaldehyde scavenger (D);
at a temperature ranging from 120° C. to 260° C., preferably ranging from 120° C. to 200° C.,
wherein the melting point of the formaldehyde scavenger (D) is at least 10° C. higher than the melt mixing temperature.

The preferred ranges referred to above in conjunction with the composition of the invention apply also to the process of the invention.

A further embodiment of the invention is a molding composition which is obtainable by the process of the invention.

In one embodiment, the molding composition of the present disclosure is reacted together and compounded prior to being used in a molding process. For instance, in one embodiment, the different components can be melted and mixed together in a conventional single or twin screw extruder at a temperature described above. Extruded strands may be produced by the extruder which are then pelletized. Prior to compounding, the polymer components may be dried to a moisture content of about 0.05 weight percent or less. If desired, the pelletized compound can be ground to any suitable particle size, such as in the range of from about 100 microns to about 500 microns.

A further embodiment of the present invention is a molded part obtainable by molding a molding composition of the present invention.

Preferred molded parts are parts used in the automotive industry, especially housings, latches, window winding systems, wiper systems, sun roof systems, seat adjustment, levers, gears, claws, pivot housings or wiper arms.

The molded parts can be obtained by the molding techniques known in the art such as extrusion, injection molding thermoforming, blow molding, rotational molding and the like.

The molding composition of the present invention is especially suitable to be used in the manufacturing of molded parts used in the automotive industry. Thus, a further embodiment of the present invention is the use of the composition according to the present invention for the manufacturing of molded parts used in the automotive industry.

Due to the excellent mechanical properties and the low formaldehyde emission the molding composition of the invention can be used for several applications where stiffness, tensile strength and high impact resistance are desired.

A further embodiment is the use of the composition or molded parts of the present invention for housings, latches, window winding systems, pulleys, wiper systems, sun roof systems, seat adjustment, levers, gears, claws, pivot housings, wiper arms, brackets or seat rails.

Due to the high tensile strength of the molding composition of the present invention the compositions can be used for injection molded structural parts that require high tensile strength (>170 MPa) as well as low flex fatigue and superior creep performance. A typical application for the composition is seat rails for automobiles.

EXAMPLES

The following components were used in the Examples:
POM 0: MVR 8 cm$^3$/10 min; Polyoxymethylene with a content of 3.4 wt.-% dioxolane comonomer; portion of terminal OH groups: 6-8 mmol/kg; melting point: 165° C.
POM 1: MVR 8 cm$^3$/10 min; Polyoxymethylene with a content of 3.4 wt.-% dioxolane comonomer; portion of terminal OH groups: 20-25 mmol/kg; melting point: 165° C.
B: Methylenediphenyl-4,4'-diisocyanate (MDI)
C: reinforcing fiber (NEG ECS 03 T-651H); sized glass fiber
E: additives (antioxidants and nucleating agents)

GUR®4120: ultrahigh molecular weight polyethylene (available from Ticona GmbH, Germany) having the following properties:
Average molecular weight: 5.0·10$^6$ g/mol
Viscosity number: 2400 ml/g
$D_{50}$: 120 μm
GUR®4150: ultrahigh molecular weight polyethylene (available from Ticona GmbH, Germany) having the following properties:
Average molecular weight: 9.2·10$^6$ g/mol
Viscosity number: 3850 ml/g
$D_{50}$: 60 μm All components beside the glass fiber were mixed together. For the compounding a ZSK 25MC, (Werner&Pfleiderer, Germany) was used (zone temperature 190° C., melt temperature about 210° C.). The glass fiber was added using a downstream feeding unit at a suitable position. The screw configuration with kneading elements was chosen so that effective thorough mixing of the components took place during the reactive extrusion as well as an optimal glass fiber length was obtained.

Unless indicated otherwise all determinations have been carried out at room temperature (23° C.).

The testing of the prepared molding compositions was performed according to the following standards:
MVR (190° C.; 2.16 kg): ISO 1133;
Charpy notched impact strength: determined at 23° C. according to ISO 179-1/1eA(CNI);
Elongation at break, stress at break and tensile modulus have been determined according to ISO 527;
Formaldehyde emission has been determined according to VDA 275 (Verband der Automobilindustrie e.V. (VDA), July 1994);
Portion of terminal OH groups in POM has been determined as described in K. Kawaguchi, E. Masuda, Y. Tajima, Journal of Applied Polymer Science, Vol. 107, 667-673 (2008).
Melting point of polyoxymethylene (POM) has been determined with Differential Scanning calorimetry (DSC); heating rate 10 K/min according to ISO 11357-1, -2, -3.
Tribology (wear rate versus steel; roughness R, =1 μm) was measured by a ball-on-3 plates test setup (MCR 301 test, v=100 mm/s, F=5N) from Anton Paar Germany GmbH.

The results are listed in the following tables.

TABLE 1

Molding compositions

| Examples | Type | A % by weight | B % by weight | C % by weight | D (melamine) % by weight | E (additives) % by weight |
|---|---|---|---|---|---|---|
| 1 | POM 1 | 71.99 | 0.7 | 26 | 0.11 | 1.2 |
| 2 (comparative) | POM 1 | 72.69 | 0 | 26 | 0.11 | 1.2 |
| 3 (comparative) | POM 0 | 71.99 | 0.7 | 26 | 0.11 | 1.2 |
| 4 (comparative) | POM 0 | 72.69 | 0 | 26 | 0.11 | 1.2 |

Table 2 shows the mechanical properties as well as the formaldehyde emissions of Examples 1 to 4

TABLE 2

Effect of MDI on the mechanical properties

|  | Example 1 | Example 2 | Improvement in % | Example 3 | Example 4 | Improvement in % |
|---|---|---|---|---|---|---|
| Stress at break [MPa] | 161 | 143 | 12 | 160 | 145 | 10 |
| Elongation at break [%] | 3.7 | 2.7 | 37 | 3.1 | 2.6 | 19 |
| Notched Charpy [kJ/m$^2$] | 12.9 | 8.8 | 47 | 11.5 | 9 | 28 |

Table 2 shows that the relative improvement of the mechanical properties of a composition comprising POM and glassfibers by adding a coupler (MDI) is significantly higher for a POM with a high portion of terminal OH groups (POM 1) compared to a POM with a lower portion of terminal OH-groups (POM 0).

Figure 2:
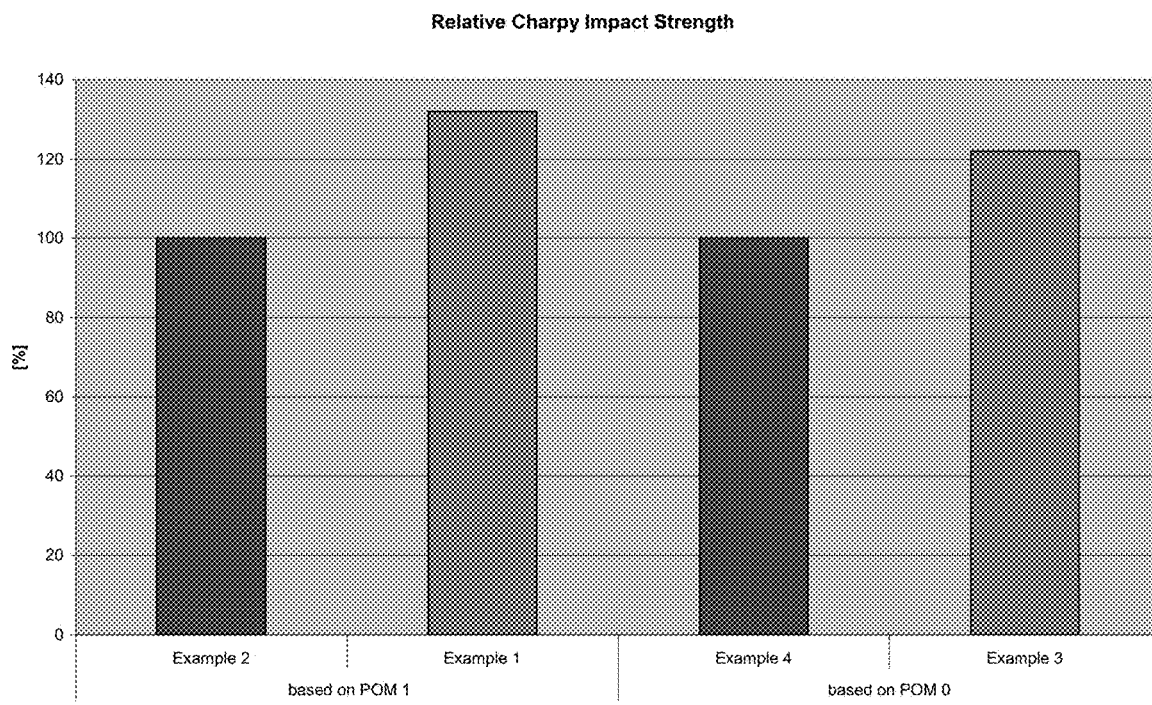
FIG. 2 shows the Charpy Impact strength of Examples 1-4.

The relative improvement in mechanical properties for POM 0 and POM 1 with (according to the invention) and without (comparative) coupling agent with respect to elongation at break and impact resistance are shown in FIG. 1 and FIG. 2.

The mechanical properties and the formaldehyde emission properties of examples 11, 12 and 1 are shown in Table 6.

TABLE 6

|  | Example 11 | Example 1 | Example 13 |
|---|---|---|---|
| Tensile Modulus [MPa] | 6340 | 9610 | 14730 |
| Stress at break [MPa] | 120.9 | 161 | 170.4 |
| Elongation at break [%] | 4.0 | 3.7 | 2.4 |
| Notched Charpy [kJ/m$^2$] | 9.9 | 12.9 | 13.7 |

TABLE 3

Different formaldehyde scavengers (D)

| | A | | B | C | D | | E |
|---|---|---|---|---|---|---|---|
| Examples | Type | % by weight | wt.-% | % by weight | Type | % by weight | wt.-% |
| 5 | POM 1 | 72.19 | 0.5 | 26 | melamine | 0.11 | 1.2 |
| 6 | POM 1 | 71.79 | 0.5 | 26 | benzoguanamine/ melamine | 0.4/0.11 | 1.2 |
| 7 | POM 1 | 71.39 | 0.5 | 26 | benzoguanamine/ melamine | 0.8/0.11 | 1.2 |

The mechanical properties as well as the formaldehyde emissions of the compositions according to the examples 5 to 7 are shown in Table 4.

TABLE 4

|  | Example 5 | Example 6 | Example 7 |
|---|---|---|---|
| VDA 275 (7 d/1.5 mm) [ppm] | 6.5 | 3.0 | 1.7 |
| Stress at break [MPa] | 153.7 | 144.6 | 137.9 |
| Elongation at break [%] | 3.5 | 3.0 | 2.7 |
| Notched Charpy [kJ/m$^2$] | 12.9 | 10.4 | 7.5 |

TABLE 5

Different amounts of glass fibers (C)

| | A | | B | C | D | | E |
|---|---|---|---|---|---|---|---|
| Examples | Type | % by weight | % by weight | % by weight | Type | % by weight | % by weight |
| 11 | POM 1 | 82.99 | 0.7 | 15 | melamine | 0.11 | 1.2 |
| 1 | POM 1 | 71.99 | 0.7 | 26 | melamine | 0.11 | 1.2 |
| 12 | POM 1 | 55.99 | 0.7 | 42 | melamine | 0.11 | 1.2 |

TABLE 7

Different formaldehyde scavenger (D)

| | A | | | C | D | | E |
|---|---|---|---|---|---|---|---|
| Examples | Type | % by weight | B wt.-% | % by weight | Type | % by weight | wt.-% |
| 13 | POM 1 | 72.1 | 0.7 | 26 | — | — | 1.2 |
| 14 | POM 1 | 71.99 | 0.7 | 26 | benzoguanamine | 0.11 | 1.2 |
| 1 | POM 1 | 71.99 | 0.7 | 26 | melamine | 0.11 | 1.2 |
| 15 | POM 1 | 71.99 | 0.7 | 26 | SDH[1)] | 0.11 | 1.2 |
| 16 | POM 1 | 71.99 | 0.7 | 26 | DCD[2)] | 0.11 | 1.2 |

[1)]sebacic dihydrazide
[2)]dicyandiamide

TABLE 8

| | Example 13 | Example 14 | Example 1 | Example 15 | Example 16 |
|---|---|---|---|---|---|
| Tensile Modulus [MPa] | 10150 | 10210 | 9610 | 9830 | 9990 |
| Stress at break [MPa] | 158.9 | 158.5 | 161 | 160.2 | 162.4 |
| Elongation at break [%] | 3.5 | 3.5 | 3.7 | 3.5 | 3.4 |
| Notched Charpy [kJ/m$^2$] | 13.7 | 13.9 | 12.9 | 13.1 | 13.4 |
| VDA 275 (7 d/1.5 mm) [ppm] | 19.6 | 14.8 | 6.9 | 7.6 | 11.2 |

Table 9 shows the molding compositions of the invention (Example 17 and 19) as well as the comparative examples 18 and 20. The amounts referred to in the table for the components are based on the total weight of the composition. The formaldehyde scavenger (D) is melamine.

TABLE 9

Molding compositions with UHMW-PE

| | A (POM 1) % by weight | B wt.-% | C % by weight | F (UHMW-PE) | | D % by weight | E % by weight |
|---|---|---|---|---|---|---|---|
| Examples | | | | Type | wt.-% | | |
| 17 | 65.19 | 0.5 | 26 | GUR ® 4120 | 7 | 0.11 | 1.2 |
| 18 | 65.69 | — | 26 | GUR ® 4120 | 7 | 0.11 | 1.2 |
| 19 | 65.19 | 0.5 | 26 | GUR ® 4150 | 7 | 0.11 | 1.2 |
| 20 | 65.69 | — | 26 | GUR ® 4150 | 7 | 0.11 | 1.2 |

Table 10 shows the mechanical properties as well as the friction and wear properties of Examples 17 to 20.

TABLE 10

Mechanical properties of the molding compositions of Examples 17 to 20

| | Examples | | | |
|---|---|---|---|---|
| | 17 | 18 | 19 | 20 |
| Notched Charpy Impact Strength [kJ/m$^2$] | 12.4 | 8 | 12.2 | 8.9 |
| Charpy Impact Strength [kJ/m$^2$] | 62.6 | 39.2 | 61.3 | 41.5 |

TABLE 10-continued

Mechanical properties of the molding compositions of Examples 17 to 20

| | Examples | | | |
|---|---|---|---|---|
| | 17 | 18 | 19 | 20 |
| Tensile Modulus [MPa] | 8800 | 8500 | 9400 | 8400 |
| Stress at break (5 mm/min.) [MPa] | 136 | 110 | 140 | 110 |
| Elongation at break (5 mm/min.) [%] | 3.3 | 2.3 | 3.2 | 2.5 |
| Coefficient of friction | 0.288 | 0.241 | 0.325 | 0.265 |
| Wear rate vs. steel ($R_z$ = 1 µm) [µm/h] | 13.4 | 8.6 | 23.8 | 12.2 |

The molding compositions of the present invention (Examples 17 and 19) show a good balance between mechanical properties, such as impact resistance, stress at break and elongation at break as well as friction and wear properties (which are important especially for automotive applications such as window winding systems or sunroof systems, e.g. pulleys or sliding elements). Further the molding compositions of the invention demonstrate a very low formaldehyde emission which makes the molded parts suitable for applications in the automotive interior.

Table 11 shows the molding compositions of the invention (Examples 21, 23 and 25) as well as comparative examples 22, 24 and 26 to 28. The amounts referred to in the table for the components are based on the total weight of the composition. The formaldehyde scavenger (D) is melamine.

TABLE 11

| | A (POM 1) | B | C | F (UHMW-PE) | | D | E |
|---|---|---|---|---|---|---|---|
| Examples | % by weight | % by weight | % by weight | type | % by weight | % by weight | % by weight |
| 21 | 66.69 | 0.5 | 25 | GUR 4120 | 7 | 0.11 | 0.7 |
| 22 | 67.19 | — | 25 | GUR 4120 | 7 | 0.11 | 0.7 |
| 23 | 68.69 | 0.5 | 25 | GUR 4120 | 5 | 0.11 | 0.7 |
| 24 | 69.19 | — | 25 | GUR 4120 | 5 | 0.11 | 0.7 |
| 25 | 70.69 | 0.5 | 25 | GUR 4120 | 3 | 0.11 | 0.7 |
| 26 | 71.19 | — | 25 | GUR 4120 | 3 | 0.11 | 0.7 |
| 27 | 73.69 | 0.5 | 25 | — | — | 0.11 | 0.7 |
| 28 | 68.19 | — | 26 | GUR 4120 | 5 | 0.11 | 0.7 |

Table 12 shows the mechanical properties as well as the wear and friction properties of Examples 21 to 28.

TABLE 12

| Mechanical properties of Examples 21 to 28 | | | | | | | | |
|---|---|---|---|---|---|---|---|---|
| | 21 | 22 | 23 | 24 | 25 | 26 | 27 | 28 |
| Charpy Notched Impact Strength [kJ/m$^2$] | 10.7 | 7.9 | 10.7 | 7.6 | 11.5 | 8.3 | 12.5 | 5.5 |
| Charpy Impact Strength [kJ/m$^2$] | 54.4 | 34.8 | 56.4 | 35.9 | 61.1 | 38.8 | 70 | — |
| Tensile Modulus (1 mm/min.) [MPa] | 8100 | 7900 | 8300 | 8100 | 8700 | 8300 | 9200 | 8700 |
| Tensile Stress at break (5 mm/min.) [MPa] | 121 | 101 | 127 | 108 | 137 | 115 | 150 | 110 |
| Elongation at break (5 mm/min.)[%] | 2.9 | 2.3 | 3.1 | 2.2 | 3.2 | 2.4 | 3.5 | 2.5 |
| Coefficient of friction | 0.28 | 0.25 | 0.28 | 0.27 | 0.30 | 0.31 | 0.44 | 0.28 |
| Wear rate vs. steel ($R_z$ = 1 μm) [μm/h] | 11.1 | 8.8 | 12.0 | 10.8 | 13.5 | 17.2 | 50.9 | 13.3 |

The molding compositions of the present invention (Examples 21, 23 and 25) show a good balance between mechanical properties, such as impact resistance, stress at break, elongation at break and friction and wear properties (which are important especially for automotive applications such as window winding systems or sunroof systems, e.g. pulleys and sliding elements). Further the molding compositions of the invention demonstrate a very low formaldehyde emission which makes the molded parts suitable for applications in the automotive interior. The molding compositions according to the comparative examples are not balanced in terms of mechanical properties and friction and wear properties.

Examples 29 to 35

The following examples 29 to 35 have been conducted under the following conditions:
POM 2: MVR 39 cm$^3$/10 min.; polyoxymethylene with a content of 3.4 wt. % dioxolane comonomer; portion of terminal OH groups: 16-25 mmol/kg; melting point: 165° C.
POM OH: MVR 39 cm$^3$/10 min.; polyoxymethylene with a content of 3.4 wt. % dioxolane comonomer; portion of terminal OH groups: 54-80 mmol/kg; melting point 165° C.
Phosphonium Bromide Catalyst: ethyltriphenylphosphoniumbromide
Coupling agent: 4,4'-diphenylmethane diisocyanate
short glass fiber: NEG EC03 T 651 H
long glass fiber: JM Star Rov 860

The POM/long glass fiber composites were prepared by melt blending the polyoxymethylene with a coupling agent, nucleating agent and a stabilizer package (antioxidant), using a 70 mm twin screw extruder. Then the long glass fiber was pulled through the die head where the fiber was impregnated with the molten resin. The extrusion conditions that were used to produce the Examples except for Example 30 are shown in the following Table 13.

TABLE 13

| Extruder Temperatures ° C. | | | | | | | | Extruder Feed Rate (kg/hr) | Extruder Screw Speed (rpm) |
|---|---|---|---|---|---|---|---|---|---|
| Barrel Zone Number | | | | | | | | | |
| 1 | 2 | 3 | 4 | 5 | 6 | 7 | DIE | | |
| 210 | 210 | 210 | 200 | 200 | 200 | 200 | 220 | 70 | 400 |

The POM 1/short glass fiber composite (Example 30) was prepared by melt blending the polyoxymethylene with the coupling agent, the nucleating agent and a stabilizer package (antioxidant), using a 40 mm twin screw extruder. The short glass fiber was fed to the extruder at barrel 6. The extrusion conditions are included in the following Table 14.

TABLE 14

| Extruder Temperatures ° C. | | | | | | | | | | Extruder Feed Rate (kg/hr) | Extruder Screw Speed (rpm) |
|---|---|---|---|---|---|---|---|---|---|---|---|
| Barrel Zone Number | | | | | | | | | | | |
| 1 | 2 | 3 | 4 | 5 | 6 | 7 | 8 | 9 | DIE | | |
| 205 | 205 | 205 | 200 | 200 | 190 | 190 | 190 | 190 | 200 | 91 | 150 |

The physical property testing was conducted using standard ISO tensile bars. The tensile bars were molded using a D Mag molding machine. The molding conditions are included in the following Table 15.

TABLE 15

| | |
|---|---|
| Barrel Zone 1 (° C.) | 177 |
| Barrel Zone 2 (° C.) | 182 |
| Barrel Zone 3 (° C.) | 188 |
| Nozzle (° C.) | 193 |
| Melt (° C.) | 205 |
| Mold Movable (° C.) | 80 |
| Mold Stationary (° C.) | 80 |
| Back Pressure (psi) | 50 |
| Hold Pressure (psi) | 11600 |
| Hold Pressure (psi) | 35 |
| Cooling Time (sec) | 15 |
| Cycle Time (sec) | 50 |
| Melt Cushion (mm) | 5 |
| Injection Velocity (mm/s) | 200 |
| Injection Time (sec) | 2 |
| Screw Retraction Time (sec) | 10 |

Examples 29 to 35 were prepared using POM 2 or POM 1 or POM OH, 4,4'-diphenylmethane diisocyanate (coupling agent), stabilizers, nucleating agent, NEG EC 03 T 651 H short glass fiber and JM Star Roy 860 long glass fiber. The amount of each component is included in the following Table 16. The amounts referred to are based on the total weight of the composition.

TABLE 16

| Example | POM 2 (wt %) | POM OH (wt %) | Phosphonium Bromide Catalyst (wt %) | Coupling Agent (wt %) | Stabilizer (wt %) | Nucleating Agent (wt %) | NEG EC30T Fiber Glass (wt %) | JM Star Rov 860 Fiber Glass (wt %) |
|---|---|---|---|---|---|---|---|---|
| 29 | 0.0 | 73.2 | 0.0 | 0.0 | 0.3 | 0.5 | 0.0 | 26.0 |
| 30 | 73.7[1] | 0.0 | 0.0 | 0.5 | 0.3 | 0.5 | 25.0 | 0.0 |
| 31 | 72.2 | 0.0 | 0.5 | 0.0 | 0.3 | 1.0 | 0.0 | 26.0 |
| 32 | 0.0 | 72.7 | 0.0 | 0.5 | 0.3 | 0.5 | 0.0 | 26.0 |
| 33 | 0.0 | 59.2 | 0.0 | 0.0 | 0.3 | 0.5 | 0.0 | 40.0 |
| 34 | 0.0 | 58.7 | 0.0 | 0.5 | 0.3 | 0.5 | 0.0 | 40.0 |
| 35 | 0.0 | 58.2 | 0.0 | 1.0 | 0.3 | 0.5 | 0.0 | 40.0 |

[1]For example 30 POM 1 has been used.

The physical property data for long glass fiber filled POM made using POM OH and no coupling agent (Comparative Example 29), improved molding composition with short glass fiber and POM 1 and a diisocyanate coupling agent (Example 30), POM 2 with long glass fiber made using the ethyltriphenylphosphoniumbromide catalyst technology (Comparative Example 31) and the molding composition comprising long glass fiber, POM OH and a diisocyanate coupling agent (Example 32) is included in the following table.

TABLE 17

| Example | Tensile Stress @Break Value (MPa) | Tensile Stress @Break Std Dev (MPa) | Tensile Modulus Value (MPa) | Tensile Modulus Std Dev (MPa) | Tensile Strain @Break Value (%) | Tensile Strain @Break Std Dev (%) | Flexural Strength Value (MPa) | Flexural Strength Std Dev (%) | Flex Modulus Value (MPa) | Flex Modulus Std Dev (MPa) | Charpy 23° C. Value (kJ/m2) | Charpy 23° C. Std Dev (kJ/m2) |
|---|---|---|---|---|---|---|---|---|---|---|---|---|
| Ex 29 | 136 | 2.80 | 10406 | 326 | 1.7 | 0.14 | 205 | 5.20 | 9384 | 222 | 42.8 | |
| Ex 30 | 150 | 0.24 | 9343 | 43 | 3.7 | 0.07 | 219 | 0.85 | 8806 | 52 | 11.6 | 0.32 |
| Ex 31 | 163 | 5.00 | 9779 | 295 | 2.3 | 0.10 | 246 | 7.50 | 9371 | 178 | 30.8 | 2.90 |
| Ex 32 | 183 | 1.20 | 10603 | 200 | 2.3 | 0.50 | 283 | 9.50 | 9725 | 275 | 31.5 | |

The tensile strength of comparative example 29 (without the diisocyanate coupling agent) is 26% lower than for the composition of Example 32 (with the diisocyanate coupling agent). This indicates that the coupling agent is required to bond the reinforcing fiber to the polymer matrix and results in the improvement of the physical properties of the compositions of the invention.

The fiber glass concentration for all of the long glass fiber samples (Examples 29, 31 and 32) is 26 wt %. The fiberglass concentration for the short glass fiber sample (Example 30) is 25 wt %. The Example 32 of the invention demonstrates improved mechanical performance compared to both the comparative example 31 as well as to the example 30 of the invention.

The tensile strength of example 32 is increased by approximately 18% compared to example 30 of the invention (use of short glass fibers), and by as much as 11% compared to comparative example 31 which uses POM 2 and long glass fibers that are prepared using ethyltriphenylphosphoniumbromide as a catalyst. The tensile modulus is increased by about 8%, and the flexural strength is increased by about 13% relative to comparative example 31.

The Charpy notched impact strength for the long glass fiber control sample (comparative example 29) is significantly higher than for the coupled long glass fiber sample (example 32), which indicates that there is better bonding between the glass fiber and the polymer in the coupled sample. The fibers tend to pull out of the polymer in the control sample (comparative example 29) rather than breaking, which increases the impact strength of the product.

The following Table 18 shows the mechanical properties of compositions according to example 33 (comparative) without a coupling agent and example 34 of the invention. The concentration of glass fiber is increased to 40 wt.-%.

TABLE 18

| Example | Tensile Stress @Break Value (MPa) | Tensile Stress @Break Std Dev (MPa) | Tensile Modulus Value (MPa) | Tensile Modulus Std Dev (MPa) | Tensile Strain @Break Value (%) | Tensile Strain @Break Std Dev (%) | Flexural Strength Value (MPa) | Flexural Strength Std Dev (%) | Flex Modulus Value (MPa) | Flex Modulus Std Dev (MPa) | Charpy 23 C. Value (kJ/m2) | Charpy 23 C. Std Dev (kJ/m2) |
|---|---|---|---|---|---|---|---|---|---|---|---|---|
| Ex 33 | 145 | 5.6 | 13407 | 432 | 1.4 | 0.05 | 225 | 5.9 | 13019 | 300 | 45.5 | |
| Ex 34 | 219 | 9.1 | 14530 | 349 | 2.08 | 0.17 | 333 | 7.9 | 13960 | 612 | 37.3 | |

The data in Table 18 shows that increasing the long glass fiber content of the compositions further significantly increases the mechanical performance of the material. A tensile strength of about 220 MPa can be achieved by increasing the fiber glass loading up to 40 wt %. This allows that material to be used in applications that require even higher tensile strength performance.

The tensile strength of the control sample (Example 33) without the diisocyanate coupling agent was 34% lower than the tensile strength for the coupled sample. This is consistent with the results for the samples with 26 wt % glass that shows that the diisocyanate coupling agent has a significant impact on the improvement in the physical properties.

Table 19 shows the impact of the amount of the coupling agent on the mechanical properties. The amount of diisocyanate used in the composition according to Example 35 is twice compared to the other examples.

TABLE 19

| Example | Tensile Stress @Break Value (MPa) | Tensile Stress @Break Std Dev (MPa) | Tensile Modulus Value (MPa) | Tensile Modulus Std Dev (MPa) | Tensile Strain @Break Value (%) | Tensile Strain @Break Std Dev (%) | Flexural Strength Value (MPa) | Flexural Strength Std Dev (%) | Flex Modulus Value (MPa) | Flex Modulus Std Dev (MPa) | Charpy 23 C. Value (kJ/m2) | Charpy 23 C. Std Dev (kJ/m2) |
|---|---|---|---|---|---|---|---|---|---|---|---|---|
| Ex 35 | 226 | 2.6 | 14238 | 312 | 2.28 | 0.1 | 353 | 9.7 | 14025 | 294 | 36.6 | |

The data in Table 19 indicates that increasing the coupling agent has an effect on the flex strength. The flex strength increases by approximately 5.7% with the addition of more coupling agent.

The polymer adhesion to the long glass fiber was measured for the compositions according to Examples 30, 31 and 34 to compare the amount of polymer adhesion for the 26 wt % and 40 wt % POM OH coupled grades with the composition according to comparative example 31 (POM 2, 26 wt % long glass fiber grade produced using the ethyltriphenylphosphoniumbromide catalyst). Broken tensile bars were evaluated using SEM to determine the percent area of the fiber pull out for each sample. The results are included in the following table 20.

TABLE 20

| Example | Fiber Pull Out Area Percent | Factor Improvement Compared to Standard 26% LTF |
|---|---|---|
| 30 | 0.0086 | 2.9 |
| 31 | 0.0253 | NA |
| 34 | 0.0099 | 2.6 |

Figure 3:
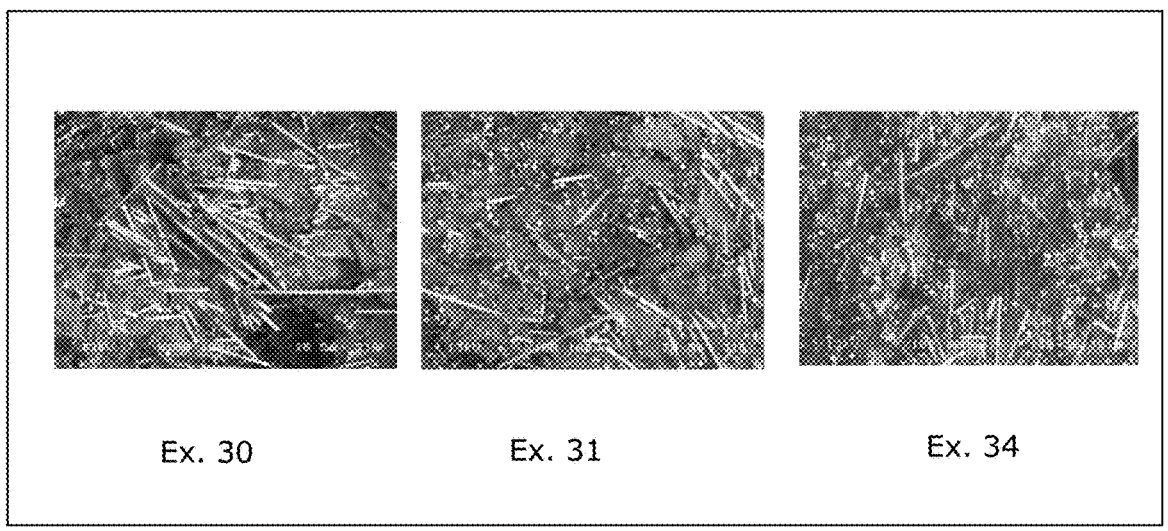
FIG. 3 provides SEM micrographs of Examples 30, 31, and 34.

The data in Table 20 shows that the polymer adhesion to the long glass fiber is significantly improved for the POM OH and POM 1 coupled samples compared to the composition according to comparative example 31. The amount of area where the fibers have been pulled out of the plastic is approximately a factor of 2.5-3.0 lower for the POM OH and POM 1 coupled samples. SEM micrographs for the 3 samples are included in FIG. 3.

The composition according to Examples 30, 31, and 34 were also tested using DMA to determine the dynamic creep behavior of the material over time. DMA creep is an accelerated creep test based on time-temperature-superposition principle (TTS), which is very useful for comparative study of long term properties. The method is described in more detail in Michael Sepe, The Materials Analyst: Part 68 A matter of time—Part 2, published Oct. 31, 2005.

The DMA creep data for the compositions at 23° C. and 80° C. are included in the following tables.

TABLE 21

| | Creep data at 23° C. | | | | | | |
|---|---|---|---|---|---|---|---|
| Example | Creep Load | Creep Compliance @1000 hrs (1/GPa) | Creep Modulus @1000 hrs (MPa) | Creep Modulus @0 hr (MPa) | Creep Modulus @0.1 hr (MPa) | Creep modulus retention* after 1000 hrs vs 0.1 hr | Creep modulus retention* after 1000 hrs vs 0 hr |
| 31 | 3 MPa | 0.38 | 2650 | 6006 | 4879 | 44.10% | 54.30% |
| 30 | 3 MPa | 0.39 | 2593 | 5956 | 4805 | 43.50% | 54.00% |
| 34 | 3 MPa | 0.27 | 3686 | 8210 | 6353 | 44.90% | 58.00% |

TABLE 22

| | Creep data at 80° C. | | | | | | |
|---|---|---|---|---|---|---|---|
| Example | Creep Load | Creep Compliance @1000 hrs (1/GPa) | Creep Modulus @1000 hrs (MPa) | Creep Modulus @0 hr (MPa) | Creep Modulus @0.1 hr (MPa) | Creep modulus retention* after 1000 hrs vs 0.1 hr | Creep modulus retention* after 1000 hrs vs 0 hr |
| 31 | 3 MPa | 0.62 | 1603 | 4673 | 3067 | 34.30% | 52.20% |
| 30 | 3 MPa | 0.51 | 1968 | 4787 | 3313 | 41.10% | 59.40% |
| 34 | 3 MPa | 0.37 | 2732 | 7315 | 4942 | 37.30% | 55.30% |

The data in tables 21 and 22 indicate that the creep performance of the POM OH and POM 1 coupled samples at 23° C. is similar to the composition of comparative example 31 (POM 2, 26 wt % long glass fiber grade produced using the ethyltriphenylphosphoniumbromide catalyst). However, the creep performance is significantly improved for the POM OH and POM 1 coupled compositions according to Examples 30 and 34 at 80° C. Further, on basis of DMA creep curves it can be seen that the creep resistance is improved for the POM OH coupled compositions of the invention, especially at 80° C.

The invention claimed is:

1. A molding composition comprising
   a) at least one polyoxymethylene (A) having terminal OH-groups of more than 20 mmol/kg, wherein the at least one polyoxymethylene is present in the composition in an amount of from 40 weight % to 90 weight % and wherein at least 25% of the terminal groups of the at least one polyoxymethylene (A) are hydroxyl groups;
   b) at least one coupling agent (B) comprising a polyisocyanate,
   c) at least one reinforcing fiber (C) in the composition in amount of from 10 weight % to 50 weight %, and
   d) at least one formaldehyde scavenger (D) comprising a nitrogen-containing scavenger,
   wherein the at least one coupling agent (B) provides a linkage between the at least one polyoxymethylene (A) and the at least one reinforcing fiber (C), and
   wherein the composition when molded exhibits a notched Charpy impact strength of from 7.5 to 13.9 kJ/m$^2$ when determined in accordance to ISO 179-1/1eA.

2. The molding composition according to claim 1, wherein the hydroxyl groups are hydroxyethylene groups.

3. The molding composition according to claim 1, wherein the at least one polyoxymethylene (A) comprises at least 50 mol-% of —CH$_2$O— repeat units.

4. The molding composition according to claim 1, wherein the at least one polyoxymethylene (A) is present in an amount of from 55 weight % to 85 weight %, wherein the weight is based on the total weight of the molding composition.

5. The molding composition according to claim 1, wherein the polyisocyanate is selected from the group consisting of an aliphatic diisocyanate, a cycloaliphatic diisocyanate, an aromatic diisocyanate and mixtures thereof.

6. The molding composition according to claim 1, wherein the at least one coupling agent (B) is present in an amount ranging from 0.1 to 5 wt.-%, wherein the weight is based on the total weight of the composition.

7. The molding composition according to claim 1, wherein the at least one formaldehyde scavenger (D) is an aromatic compound.

8. The molding composition according to claim 1, wherein the at least one formaldehyde scavenger (D) has a melting point higher than 235° C.

9. The molding composition according to claim 1, wherein the at least one formaldehyde scavenger (D) has a pKa value ranging from 4.5 to 10.

10. The molding composition according to claim 1, wherein the at least one formaldehyde scavenger (D) has a melting point which is at least 10° C. higher than the melting point of the polyoxymethylene (A).

11. The molding composition according to claim 1, wherein the at least one formaldehyde scavenger (D) is melamine.

12. The molding composition according to claim 1, wherein the at least one formaldehyde scavenger (D) is present in the composition in an amount up to 2 wt.-%, wherein the weight is based on the total weight of the composition.

13. The molding composition according to claim 1, further comprising one or more tribological modifiers.

14. The molding composition according to claim 13, wherein the one or more tribological modifiers is an ultra-high molecular weight polyethylene having a viscosity number of higher than 1000 ml/g, as determined according to ISO 1628, part 3; concentration in decahydronaphthalin: 0.0002 g/ml.

15. The molding composition according to claim 13, wherein the one or more tribological modifiers is an ultra-high molecular weight polyethylene which has a mean particle diameter $D_{50}$ ranging from 1 to 5000 μm.

16. The molding composition according to claim 15, wherein the one or more tribological modifiers is an ultra-high molecular weight polyethylene which is present in the molding composition in an amount up to 30 wt.-%, wherein the weight is based on the total weight of the composition.

17. The molding composition according to claim 1 wherein the at least one reinforcing fiber (C) is a continuous-filament fiber.

18. A molded part obtained by molding the molding composition according to claim 1.

19. A process for manufacturing a molding composition, the process comprising the following steps:
   melt mixing the molding composition according to claim 1 at a temperature ranging from between 120° C. to 260° C.,
   wherein the melting point of the formaldehyde scavenger is at least 10° C. higher than the melt mixing temperature.

20. A process for manufacturing a long fiber reinforced molding composition comprising
   a) impregnating a continuous fiber filament with a polymer matrix comprising
      i) at least one polyoxymethylene (A) having terminal OH— groups of more than 20 mmol/kg, wherein at least 25% of the terminal groups of the at least one polyoxymethylene (A) are hydroxyl groups,
      ii) at least one coupling agent (B), and
      iii) at least one formaldehyde scavenger (D) comprising a nitrogen-containing scavenger and optionally other additives; and
      wherein the fiber filament is present in the composition in amount of from 10 weight % to 50 weight %;
   b) optionally cutting the impregnated fiber filament into pellets,
   wherein the at least one polyoxymethylene is present in the composition in an amount of from about 40 weight % to 90 weight %,
   wherein the at least one coupling agent (B) provides a linkage between the at least one polyoxymethylene (A) and the at least one reinforcing fiber (C) in the composition, and
   wherein the composition when molded exhibits a notched Charpy impact strength of from 7.5 to 13.9 kJ/m$^2$ when determined in accordance to ISO 179-1/1eA.

21. The process according to claim 20 wherein the polymer matrix is melt mixed prior to the impregnation of the continuous fiber filament.

22. The process according to claim 20 wherein the continuous fiber filament is part of a roving or yarn.

23. The process according to claim 20 wherein the polyoxymethylene (A) has a MVR of more than 35 cm$^3$/10 min, determined according to ISO 1133 at 190° C. and 2.16 kg.

24. The process according to claim 20 wherein the polyoxymethylene (A) has a content of terminal hydroxyl groups of up to 40 mmol/kg.

25. The process according to claim 20 wherein the molding composition comprises 0.1 to 5.0 wt.-% of a coupling agent (B) comprising a polyisocyanate; and 5 to 45 wt.-% of the continuous fiber filament.

26. The process according to claim 20 which is a pultrusion process.

27. The molding composition according to claim 1, wherein the at least one reinforcing fiber (C) is in the composition in amount of from 15 weight % to 45 weight %.

28. The molding composition according to claim 1, wherein the at least one reinforcing fiber (C) is in the composition in amount of from 25 weight % to 42 weight %.

* * * * *